US008488832B2

(12) United States Patent
Leung

(10) Patent No.: US 8,488,832 B2
(45) Date of Patent: Jul. 16, 2013

(54) DOCKING STATION FOR MEDIA PLAYER

(75) Inventor: Wilson Wai Sing Leung, Tai Po (HK)

(73) Assignee: Alco Electronics Limited, Quarry Bay, Hong Kong (CN)

( * ) Notice: Subject to any disclaimer, the term of this patent is extended or adjusted under 35 U.S.C. 154(b) by 180 days.

(21) Appl. No.: 13/018,637

(22) Filed: Feb. 1, 2011

(65) Prior Publication Data

US 2012/0189156 A1 Jul. 26, 2012

(30) Foreign Application Priority Data

Jan. 20, 2011 (HK) .................................... 11100591

(51) Int. Cl.
*H04R 1/02* (2006.01)
(52) U.S. Cl.
USPC .......................................................... 381/387
(58) Field of Classification Search
USPC .......................................................... 381/387
See application file for complete search history.

(56) References Cited

U.S. PATENT DOCUMENTS

| 6,963,487 | B2 | 11/2005 | Billington et al. | |
|---|---|---|---|---|
| 6,996,077 | B1 * | 2/2006 | Suenaga et al. | 370/320 |
| 7,599,177 | B2 | 10/2009 | Jaffe et al. | |
| 7,606,526 | B2 | 10/2009 | Patsiokas et al. | |
| 7,624,955 | B2 * | 12/2009 | McGill | 248/181.1 |
| 2003/0223185 | A1 | 12/2003 | Doczy et al. | |
| 2003/0235029 | A1 | 12/2003 | Doherty et al. | |
| 2006/0013411 | A1 | 1/2006 | Lin | |
| 2006/0043253 | A1 | 3/2006 | Huang et al. | |
| 2006/0116009 | A1 | 6/2006 | Langberg et al. | |
| 2006/0280045 | A1 | 12/2006 | Ritsher et al. | |

(Continued)

FOREIGN PATENT DOCUMENTS

| CN | 1414441 A | 4/2003 |
|---|---|---|
| CN | 2935379 Y | 8/2007 |

(Continued)

OTHER PUBLICATIONS

Great Britain Patent Office, Examination Report and Search Report in GB Patent Application No. 1200959.3 (May 2, 2012).

*Primary Examiner* — Curtis Kuntz
*Assistant Examiner* — David J Ho
(74) *Attorney, Agent, or Firm* — Leydig, Voit & Mayer, Ltd.

(57) ABSTRACT

A docking station for an iPad or the like, has a base, a support connected to the base and holding an iPad, a signal connector, an operating circuit for amplifying an audio signal received from the iPad via the connector, and speakers for reproducing sound based on an audio signal amplified by the operating circuit. The support is movable relative to the base between an erected position for operation of the docking station and a collapsed position when the docking station is not in use and is, in the erected position, movable between two angular positions, supporting the iPad in portrait and landscape orientations. The base has a recess for receiving at least part of the support in the collapsed position, and providing an unobtrusive profile to the docking station in the collapsed position of the support.

13 Claims, 17 Drawing Sheets

U.S. PATENT DOCUMENTS

| | | |
|---|---|---|
| 2007/0035917 A1 | 2/2007 | Hotelling et al. |
| 2007/0288678 A1 | 12/2007 | Langberg et al. |
| 2008/0006746 A1* | 1/2008 | Volochine ................. 248/169 |
| 2008/0025544 A1* | 1/2008 | Maldonado ................ 381/334 |
| 2008/0089547 A1 | 4/2008 | Young et al. |
| 2008/0158411 A1 | 7/2008 | Firnberg |
| 2009/0080684 A1* | 3/2009 | Groset et al. ............... 381/387 |
| 2009/0219262 A1* | 9/2009 | Champion et al. .......... 345/179 |
| 2011/0046757 A1* | 2/2011 | Leung ........................ 700/94 |
| 2011/0170256 A1 | 7/2011 | Lee |
| 2012/0188689 A1* | 7/2012 | Leung ...................... 361/679.01 |

FOREIGN PATENT DOCUMENTS

| | | |
|---|---|---|
| CN | 101379742 A | 3/2009 |
| CN | 201696820 U | 1/2011 |
| CN | 201696825 U | 1/2011 |
| DE | 203 18 230 U1 | 4/2004 |
| GB | 2 451 894 A | 2/2009 |
| WO | WO 2010/028293 A2 | 3/2010 |

* cited by examiner

DOCKING STATION FOR MEDIA PLAYER

The present invention relates to a docking station for a portable media (or multimedia) player which is an electronic device including media playing functions for playing audio and/or video contents, such as an iPod, iPhone or iPad.

BACKGROUND OF THE INVENTION

Media players of the portable type concerned in general are becoming ever increasingly popular. Most of such media players do not include built-in speakers and hence require use of external earphones, or any such speakers are not of adequate quality to meet higher expectations. Docking stations equipped with larger, better quality speakers are available on the markets for connecting such media players to play better-quality sound, but some of them suffer from drawbacks as to size or design against ease of portability.

The invention seeks to mitigate or at least alleviate such drawbacks by providing a new or otherwise improved docking station for media player.

SUMMARY OF THE INVENTION

According to the invention, there is provided a docking station for a media player, having a base, a support connected to the base and adapted for in operation releasably holding a said media player, a signal connector for connection with a said media player, an operating circuit connected to the connector for amplifying an audio signal received from a said media player via the connector, and at least one speaker connected to the operating circuit for reproducing sound based on an audio signal amplified by the operating circuit. The support is movable relative to the base between an erected position for operation and a collapsed position when not in use and is, in the erected position, movable to two angular positions for supporting a said media player in respective portrait and landscape orientations relative to the base. The base has a recess for receiving at least part of the support in the collapsed position, thereby resulting in a non-protrusive shape for the docking station.

Preferably, the support has a first part movably connected to the base for movement between the erected position and the collapsed position, and a second part for releasably holding a said media player.

More preferably, the support is pivotably connected with its first part to the base for angular movement between the erected position and the collapsed position.

More preferably, the second part of the support is angularly movable relative to the first part for supporting a said media player in either the portrait or the landscape orientation.

Further more preferably, the second part of the support is pivotably connected to the first part.

It is preferred that the first part of the support is pivotably connected to the base for angular movement about a first axis, and the second part of the support is pivotably connected to the first part, for supporting a said media player in either the portrait or the landscape orientation, about a second axis which is perpendicular to the first axis.

It is preferred that the second part of the support is pivotably connected to the first part for pivotal movement about two mutually perpendicular axes.

In a preferred embodiment, the support has a portion arranged to engage the base for stability when the support is in the erected position.

It is preferred that the support has a portion arranged to engage the base for stability when the support is in the erected position, the second part of the support including the portion.

It is preferred that the base has a plurality of detents for selective engagement by the portion of the support, each detent determining a respective angle at which the support is in the erected position.

In a preferred embodiment, the support is locatable in the erected position at a selected one of a plurality of angles relative to the base.

It is preferred that the recess has a general shape matching that of the support for receiving the support in a fitting manner.

It is further preferred that the recess and the support have complementary general shapes.

Preferably, the support in the collapsed position lies flush with an outer surface of the base around the recess.

Preferably, the support has a general shape resembling that of the letter "T".

Preferably, the signal connector is located on the support.

Preferably, the base has a generally flat body for use lying flat on a horizontal surface, and the support is provided on an upper side of the base, in which the recess is formed.

Preferably, the base houses the operating circuit and locates said at least one speaker.

Preferably, the operating circuit includes a clock circuit.

Preferably, the operating circuit includes a radio circuit.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
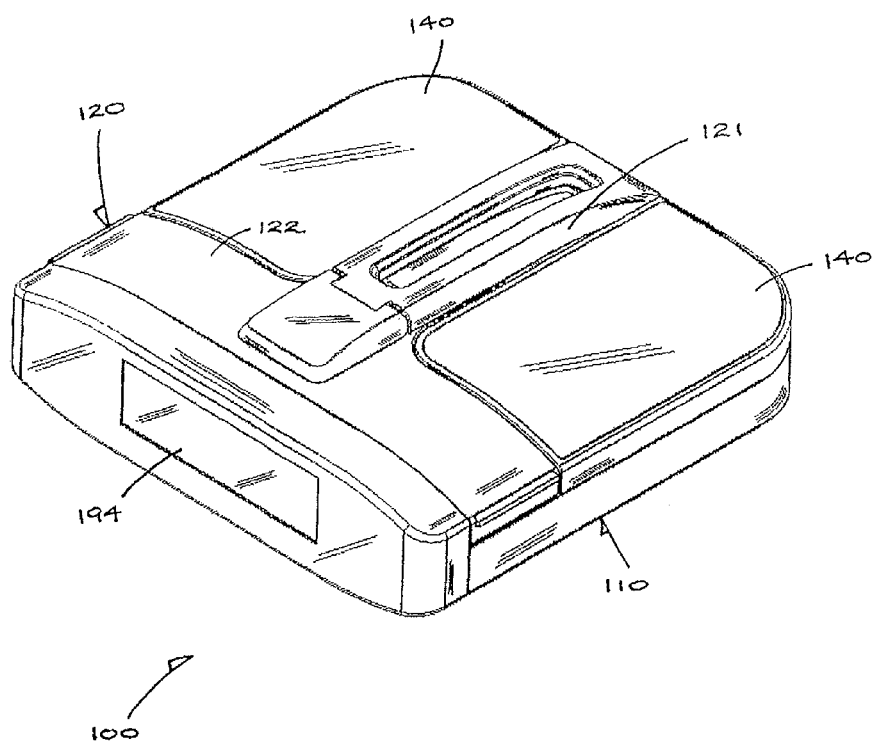
FIG. 1 is a front and right side perspective view of an embodiment of a docking station for media player in accordance with the invention, showing the docking station in a collapsed state.
Figure 2:
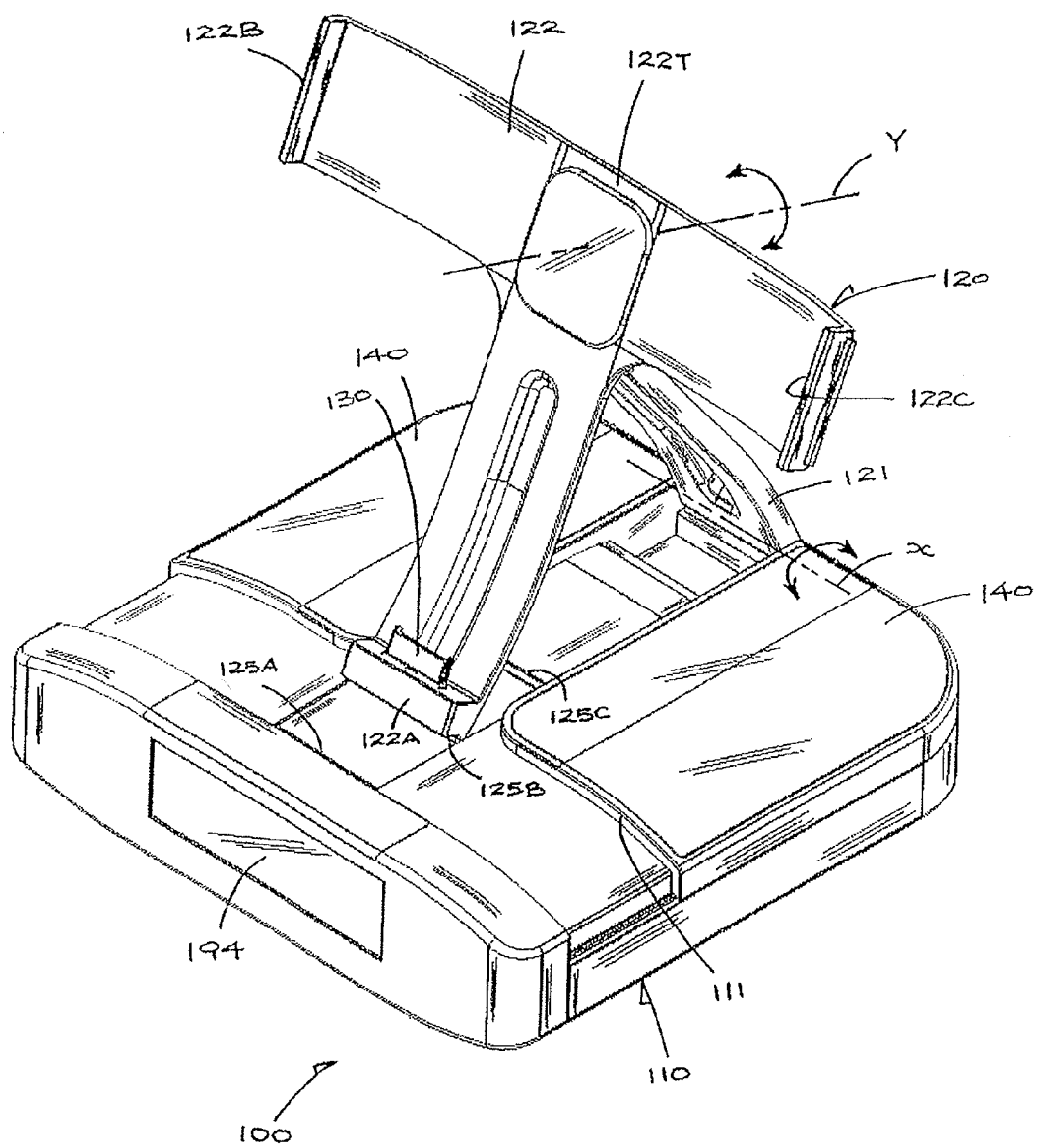
FIG. 2 is a front and right side perspective view of the docking station of FIG. 1, showing the docking station in a first erected state.
Figure 3:
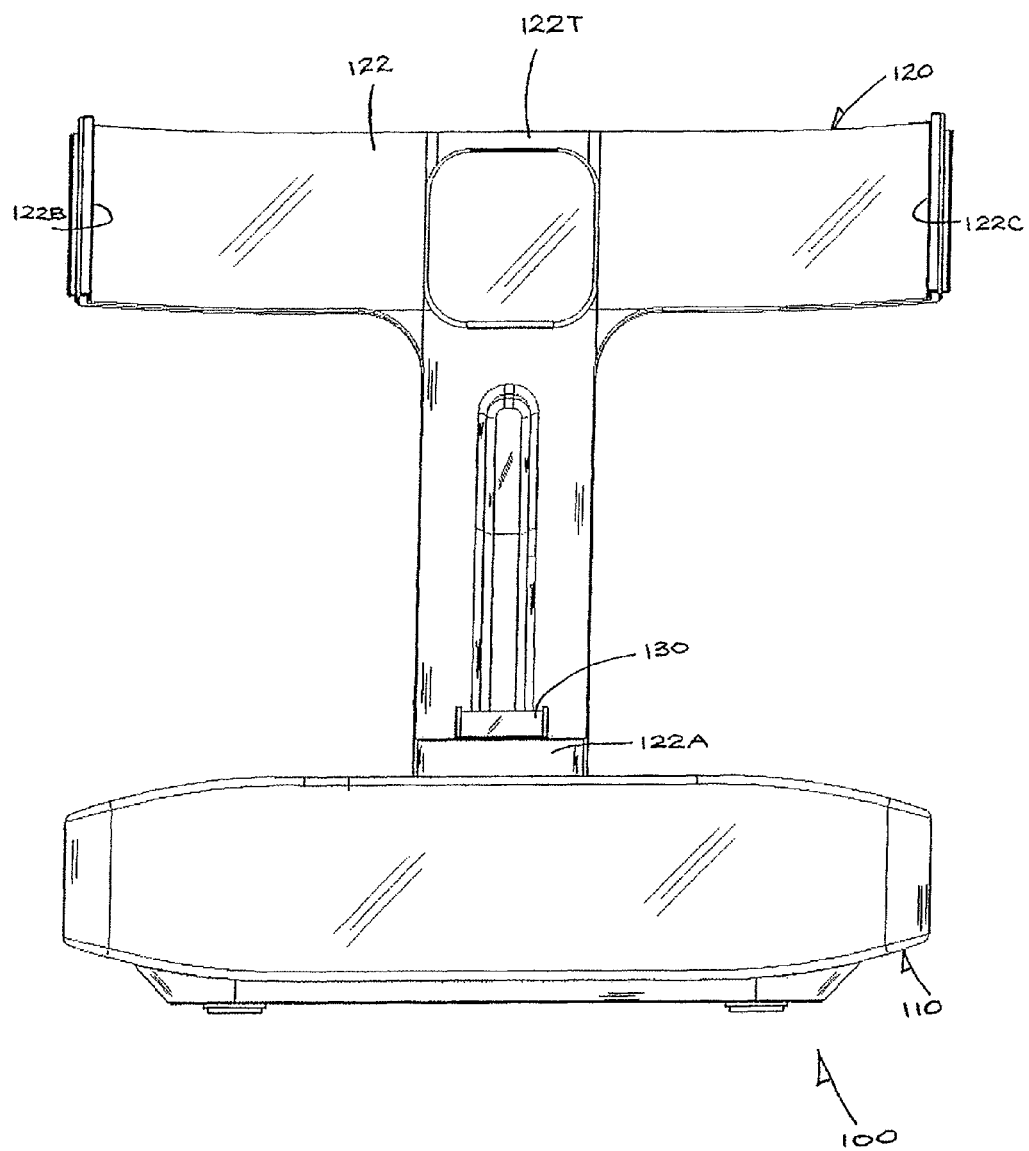
FIG. 3 is a front view of the docking station of FIG. 3.
Figure 4:
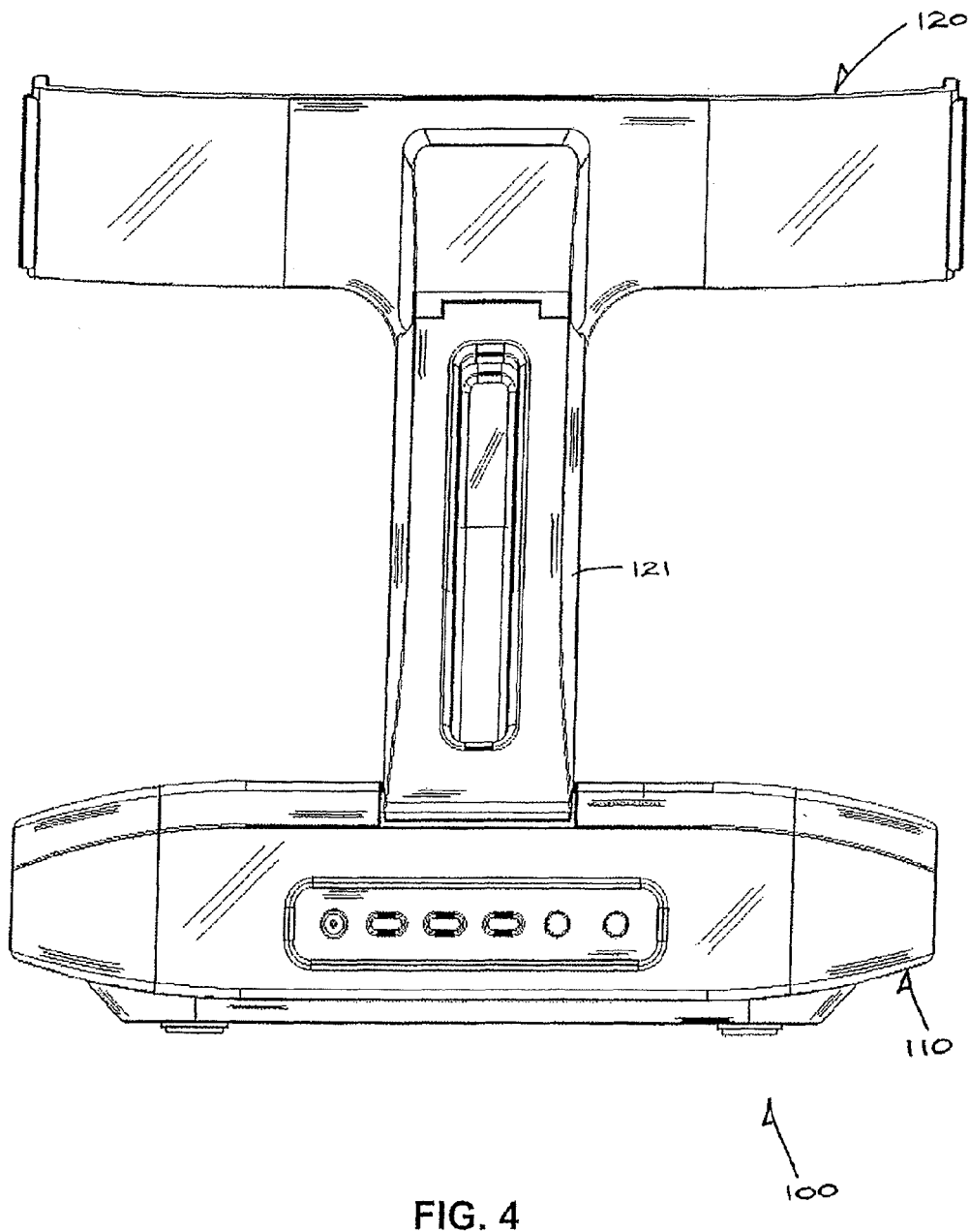
FIG. 4 is a rear view of the docking station of FIG. 3.
Figure 5:
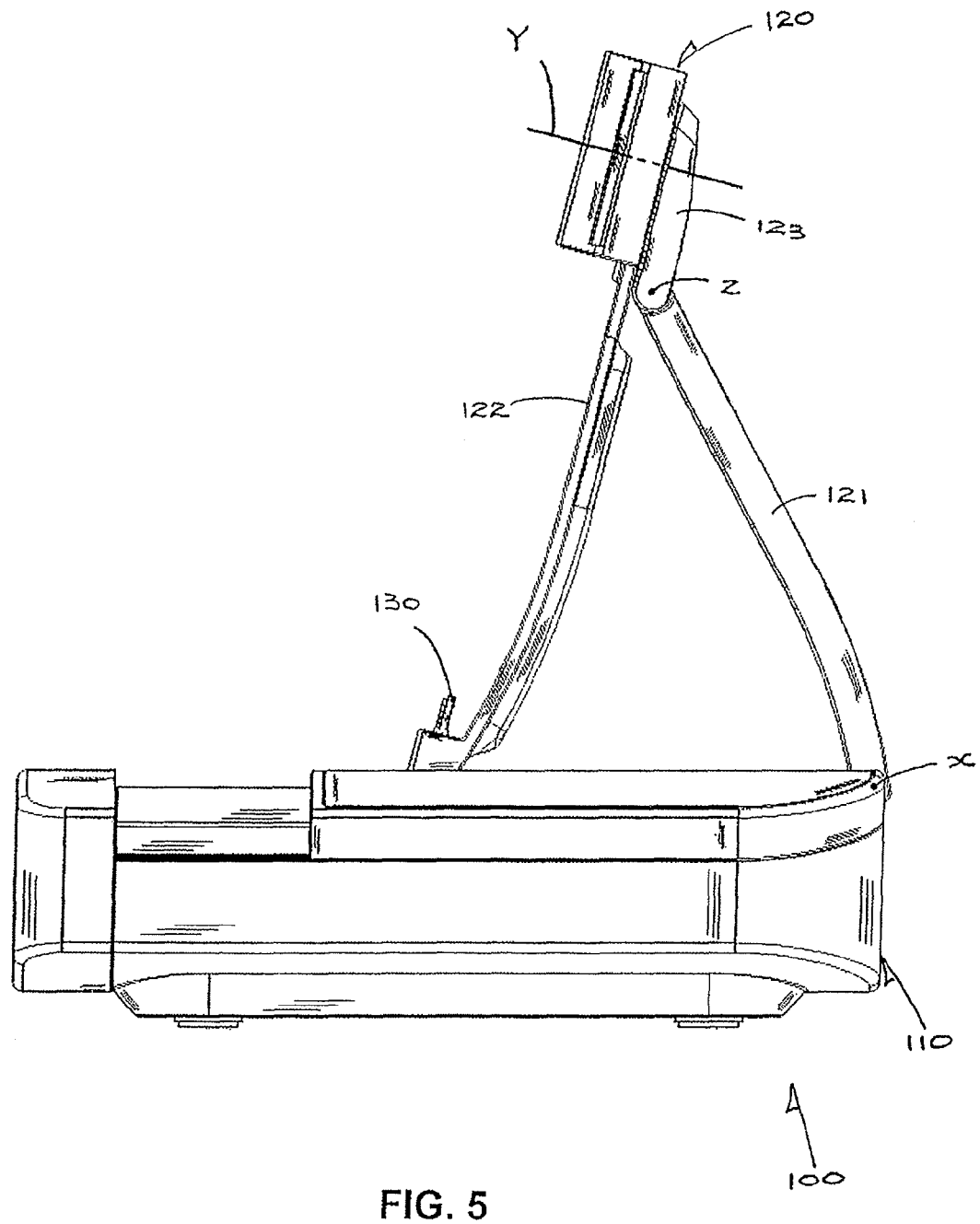
FIG. 5 is a right side view of the docking station of FIG. 3.
Figure 6:
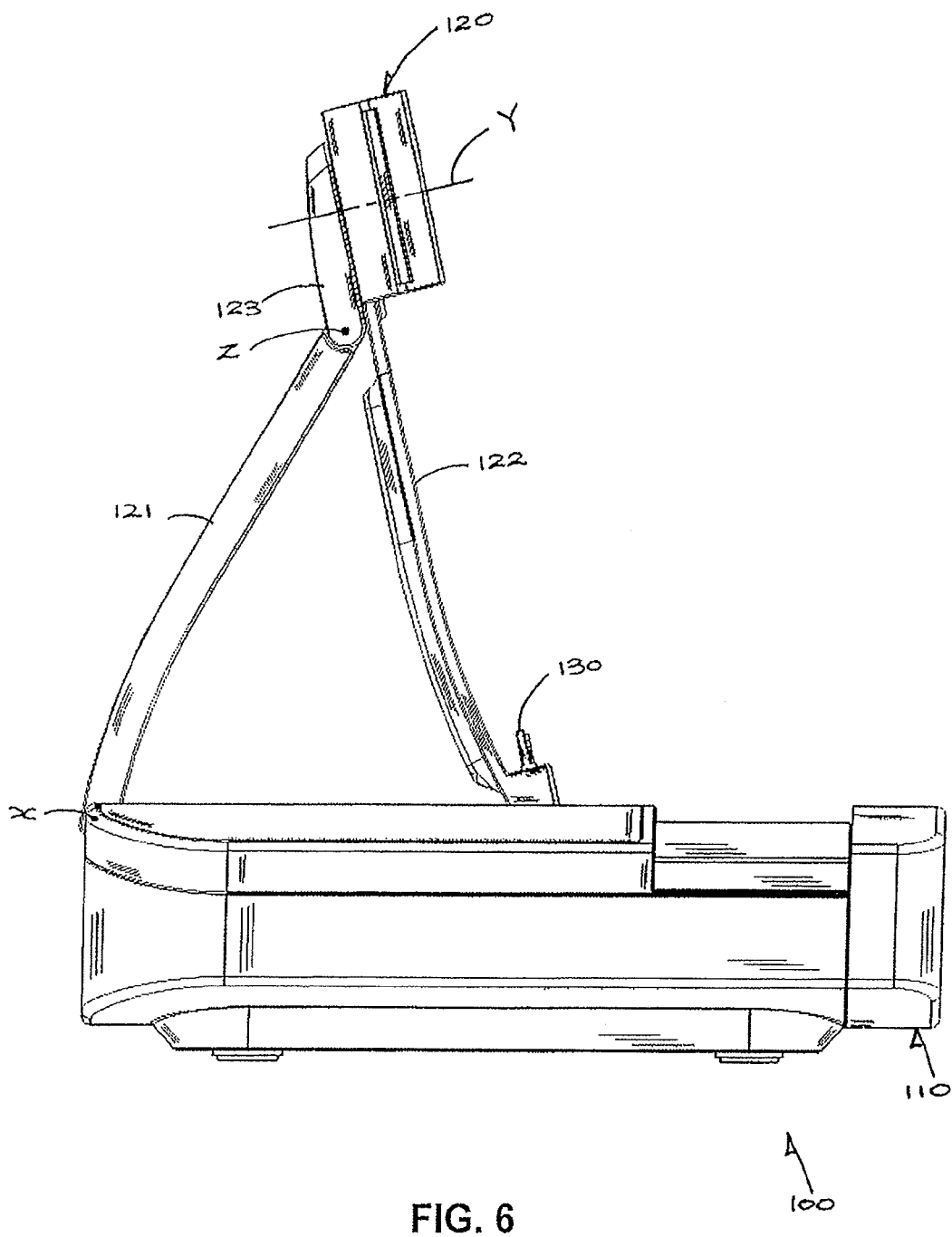
FIG. 6 is a left side view of the docking station of FIG. 3.
Figure 7:
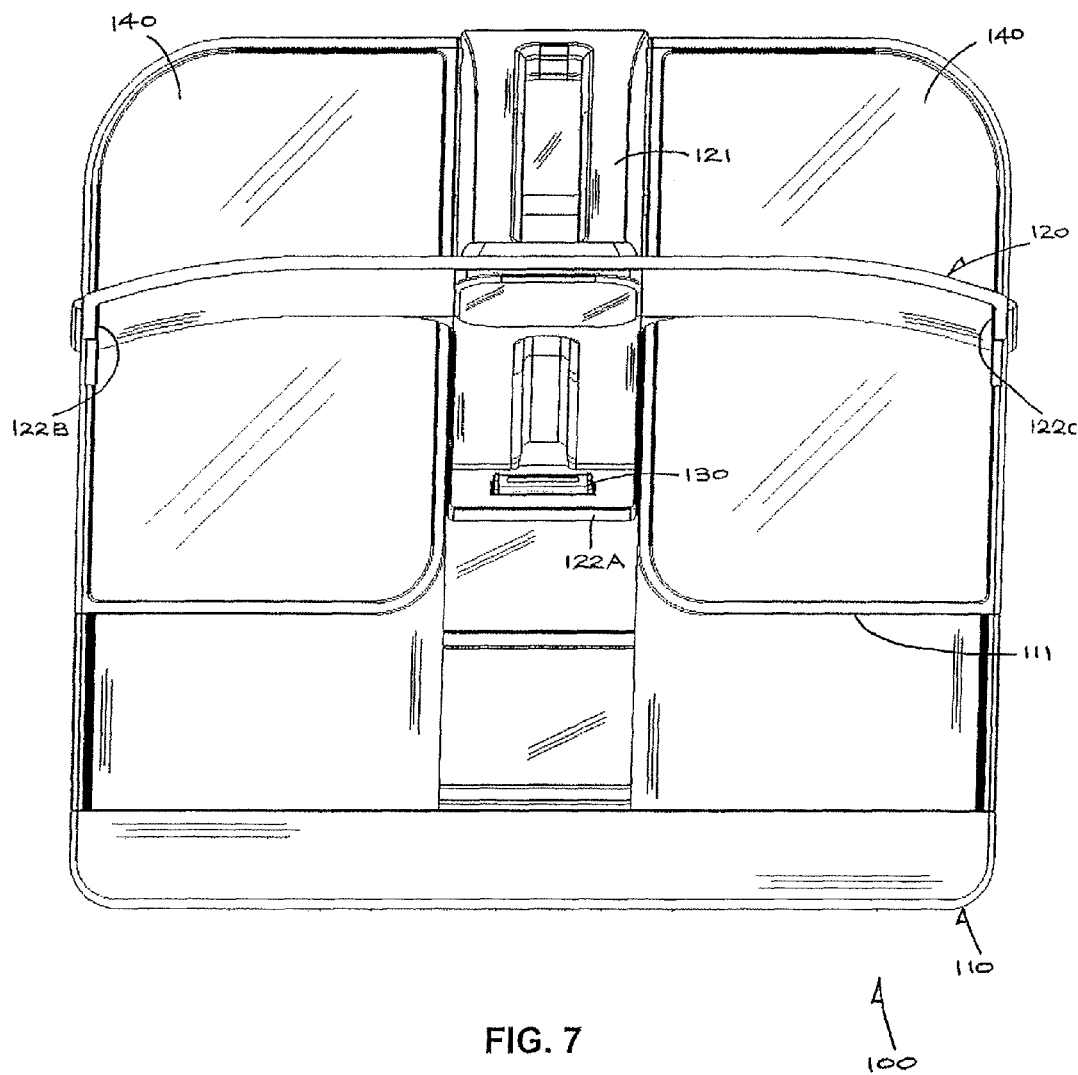
FIG. 7 is a top plan view of the docking station of FIG. 3.
Figure 8:
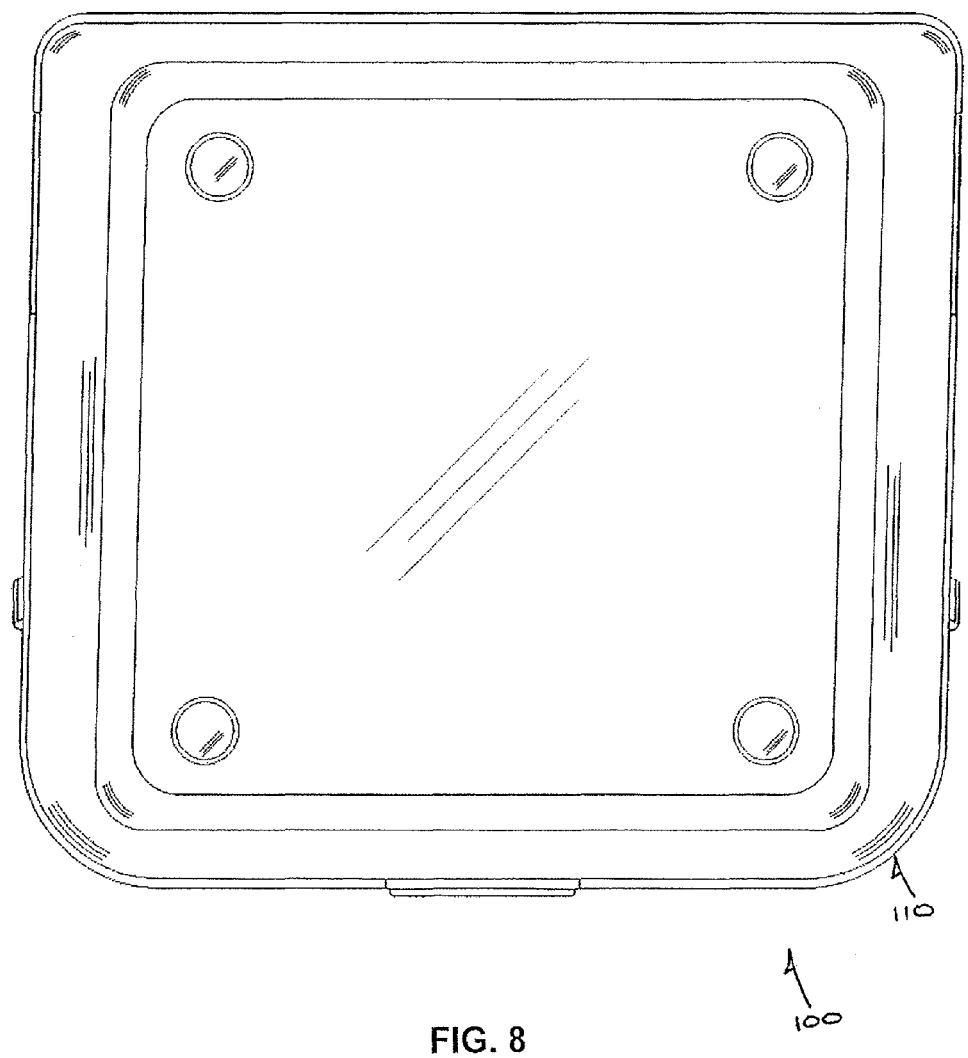
FIG. 8 is a bottom plan view of the docking station of FIG. 3.
Figure 9:
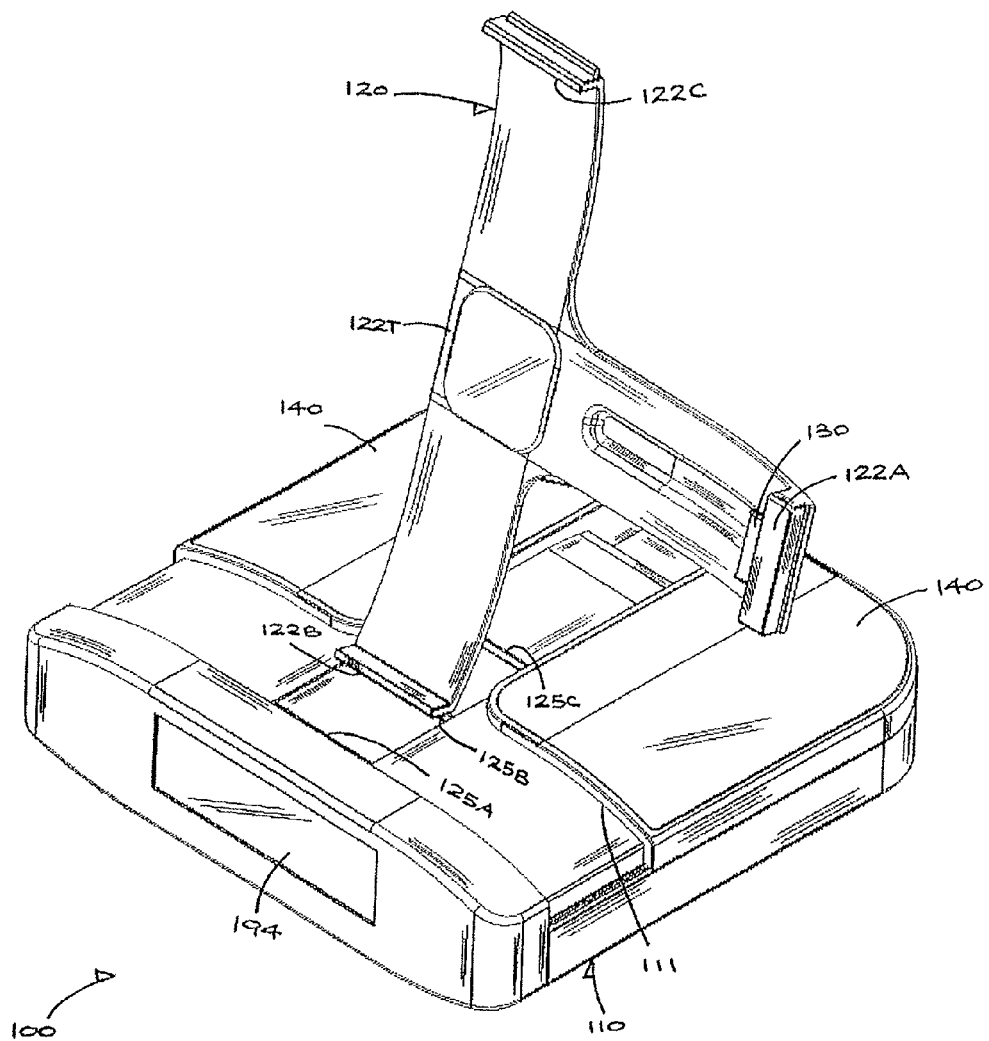
FIG. 9 is a front and right side perspective view similar to FIG. 2, showing the docking station in a second erected state.

Referring to FIGS. 1 to 17 of the drawings, there is shown a docking station 100 for a media player, such as an iPad 200, embodying the invention, which has a base 110 and a support in the form of a stand 120 connected to the base 110 and adapted for in operation releasably holding the iPad 200. A signal connector 130, e.g. a standard 30-pin connector for iPhone/iPad, is located on the stand 120 for connection with the iPad 200. An operating circuit 190 is connected to the connector 130, by means of cables 131 running through the stand 120, for amplifying an audio signal received from the iPad 200 via the connector 130. Also included is at least one speaker, or preferably a pair of left and right main speakers 140 and a subwoofer speaker 141 which are connected to the operating circuit 190 for reproducing sound based on an audio signal amplified by the operating circuit 190.

The base 110 has a generally flat body for use lying flat on a horizontal surface e.g. a desktop, which houses the operating circuit 190 and locates the main speakers 140 within opposite left and right sides of the base 110. The subwoofer speaker 141 may be located centrally inside. The operating circuit 190 includes, amongst others, an amplifier circuit (audio power amplifier) 191, a clock circuit 192, a radio circuit 193, and an LCD display 194 on the front of the base 110, all being under the control of an MCU 195 with sound handled by an audio signal processor 196 where appropriate.

Being provided on an upper side of the base 110, the stand 120 is movable relative to the base 110 between an erected position (FIG. 2) for operation and a collapsed position (FIG. 1) when not in use. In the erected position, the stand 120 is movable to two angular positions (FIGS. 2 and 9) for supporting the iPad 200 in respective portrait orientation (FIG. 11) and landscape orientation (FIG. 16) relative to the base 110.

The base 110 has a recess 111 for receiving at least part of the stand 120 in the collapsed position, thereby resulting in a non-protrusive shape or profile for the docking station 100 (FIG. 1). The term "non-protrusive" refers to the shape or profile which is smoothly contoured or unobtrusive e.g. having no protrusions.

In a specific construction, the stand 120 has a leg 121 (i.e. first part) movably connected to the base 110 for movement between the erected position and the collapsed position, and a bracket 122 (i.e. second part) for releasably holding the iPad 200. The stand 120 has a general shape resembling that of the letter as dictated by its bracket 122 being considerably larger than the leg 121. The leg 121, being generally straight, is connected to the back of a T-junction 122T of the bracket 122 by means of a small hinge member 123 on the back. Both parts 121 and 122 are generally flat, and so is the hinge member 123.

The stand 120 is pivotably connected with its leg 121 to the base 110 for angular movement between the erected position and the collapsed position. The bracket 122 is pivotably connected to the leg 121 by means of the hinge member 123 through a double hinge connection, hence angularly movable relative thereto, for supporting the iPad 200 in either the portrait or the landscape orientation and for folding close to or against the leg 121 in the collapsed position.

More specifically, the leg 121 is hinged at its lower end to the rear of the base 110 for angular movement about a first, horizontal axis X. And, the bracket 122 is hinged to the leg 121 at an upper end thereof, via a swiveling hinge between the bracket 122 and the hinge member 123, for turning to support the iPad 200 in either the portrait or the landscape orientation, about a second axis Y which is perpendicular to the first axis X. The bracket 122 is also hinged to the leg 121, via a folding hinge between the hinge member 123 and the leg 121, for folding about another horizontal axis Z (FIG. 5) such that the two stand parts 121 and 122 can be folded close together and against the base 110. Overall, the bracket 122 is pivotably connected to the leg 121 for pivotal movement about two mutually perpendicular axes Y and Z.

Being T-shaped, the bracket 122 has a central lower end 122A (of the central limb) and a pair of opposite left and right ends 122B and 122C (of the cross limb). The lower end 122A together with the connector 130 located thereon serve to hold (and electrically connect) the iPad 200 by its bottom (and the socket thereat), with the left and right ends 122B and 122C being hooked and grabbing the iPad 200 (FIG. 11) across its width. The bracket 122 may be rotated about the leg 121 through an angle of 90° clockwise or anti-clockwise to turn the iPad from the portrait to landscape orientation, or vice versa.

Figure 10:
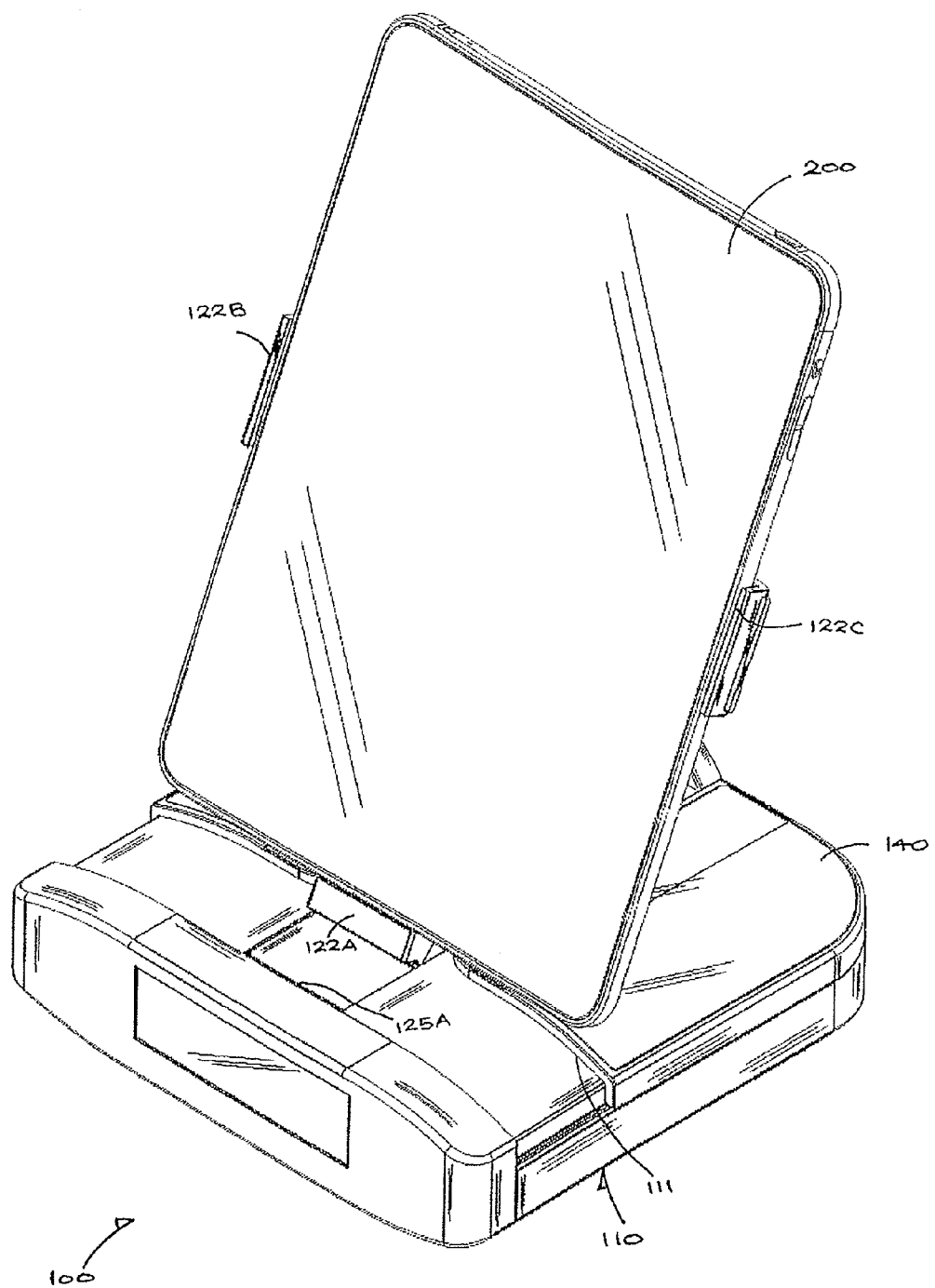
FIG. 10 is a front and right side perspective view corresponding to FIG. 2, showing the docking station supporting a media player in a portrait orientation.
Figure 11:
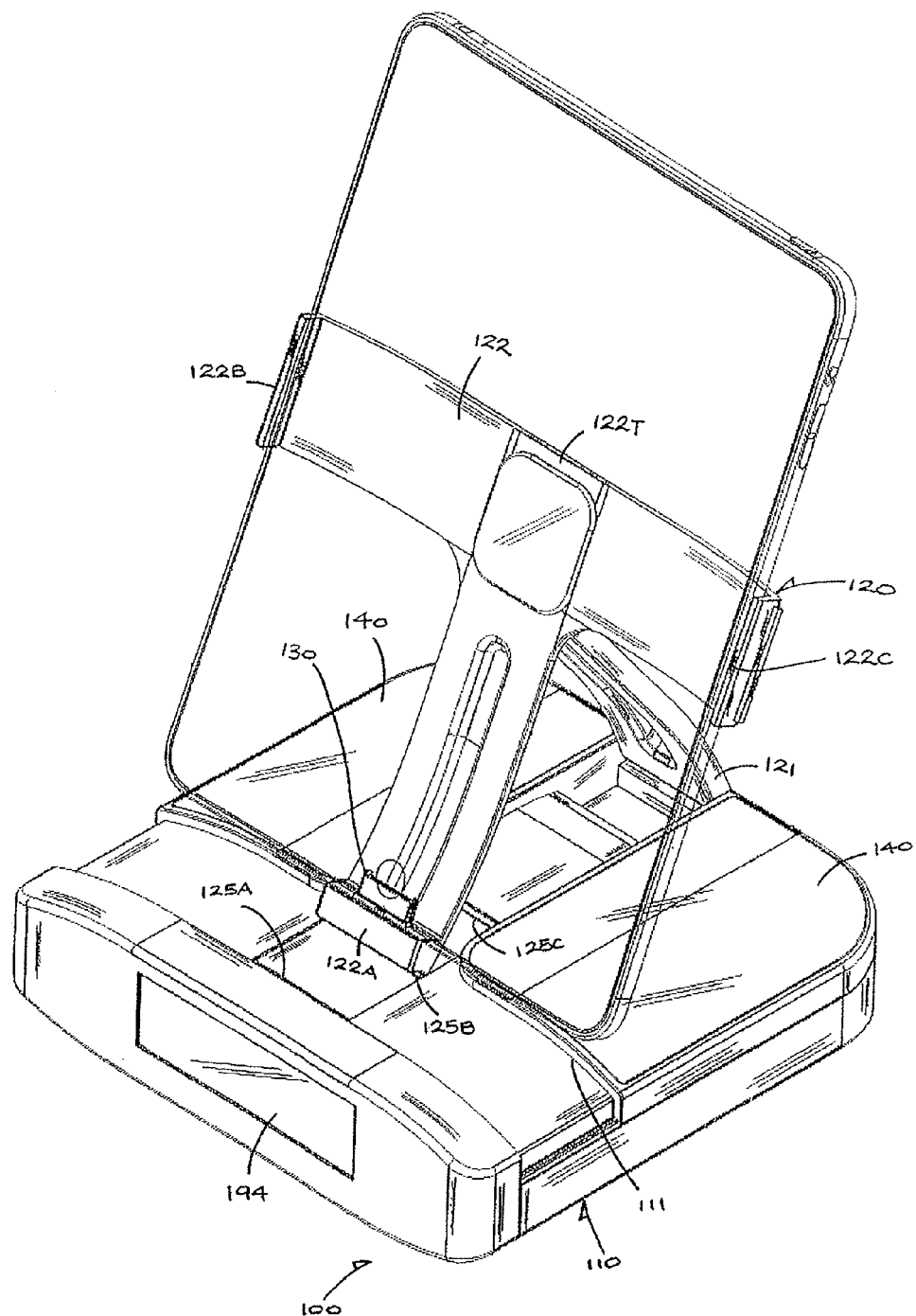
FIG. 11 is a front and right side perspective view similar to FIG. 10, showing the media player transparent to reveal features behind it.
Figure 12:
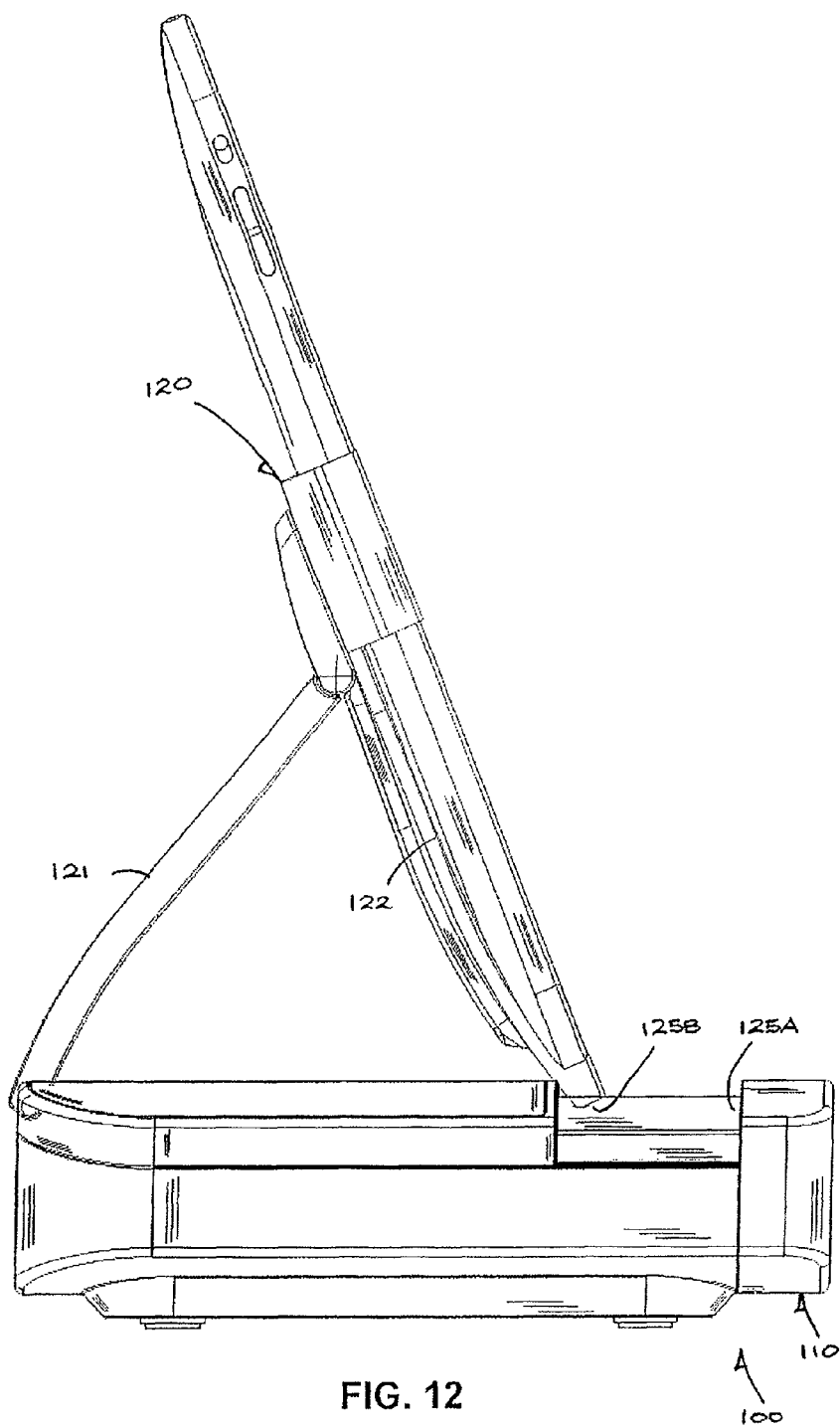
FIG. 12 is a left side view of the docking station of FIG. 10.
Figure 13:
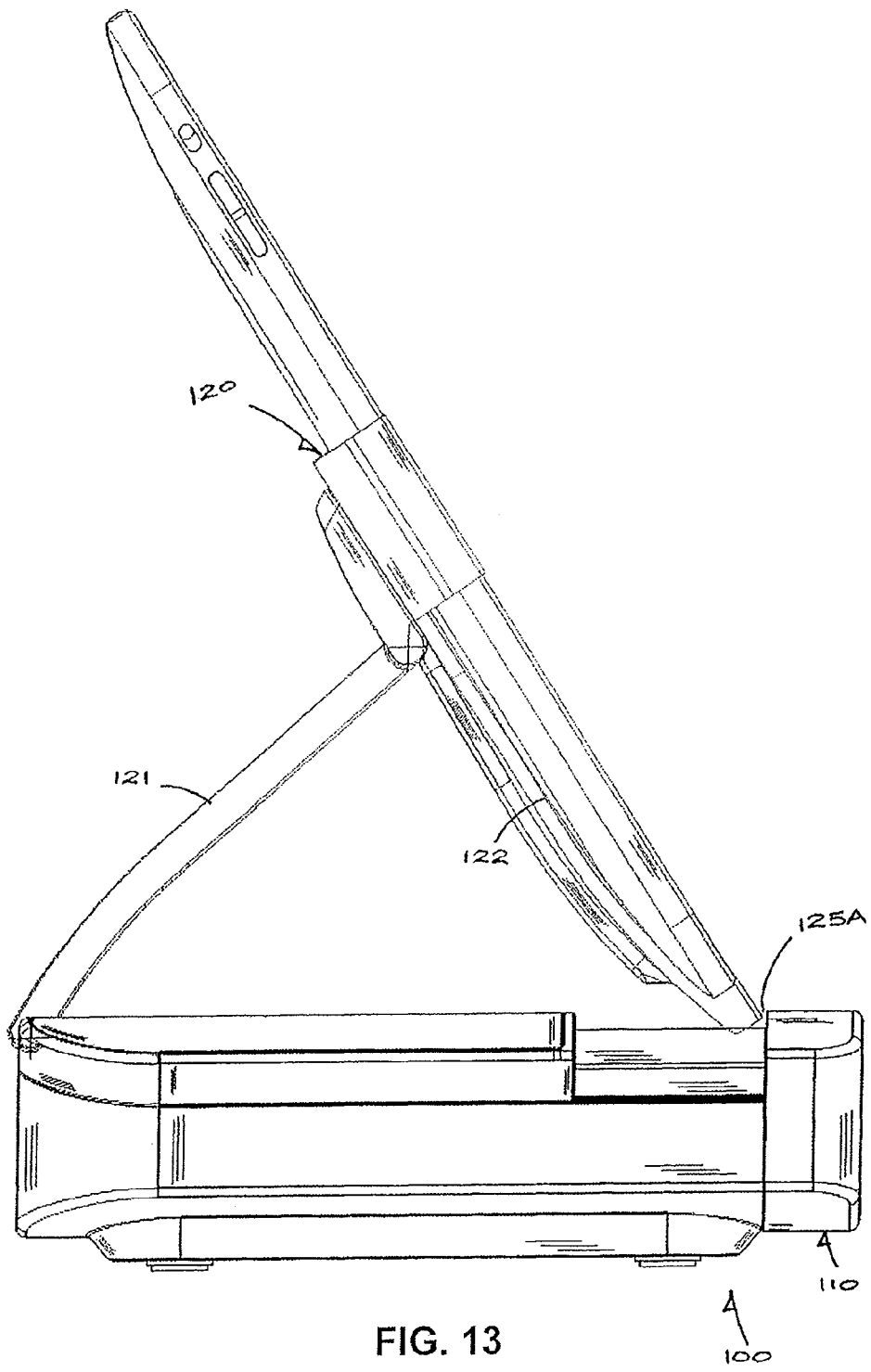
FIG. 13 is another left side view of the docking station of FIG. 10, showing the media player being supported in a more inclined position.
Figure 14:
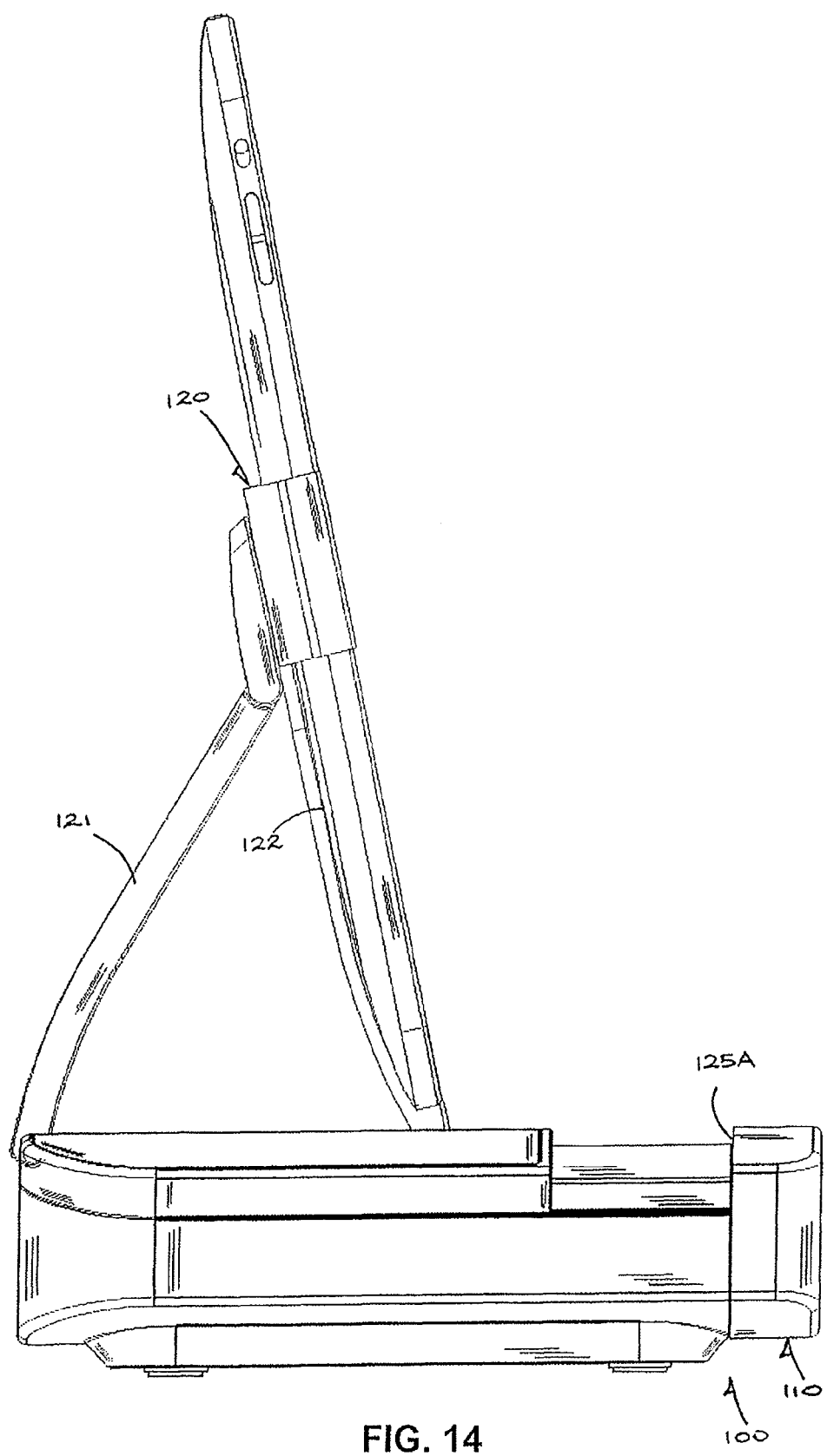
FIG. 14 is a further left side view of the docking station of FIG. 10, showing the media player being supported in a less inclined position.
Figure 15:
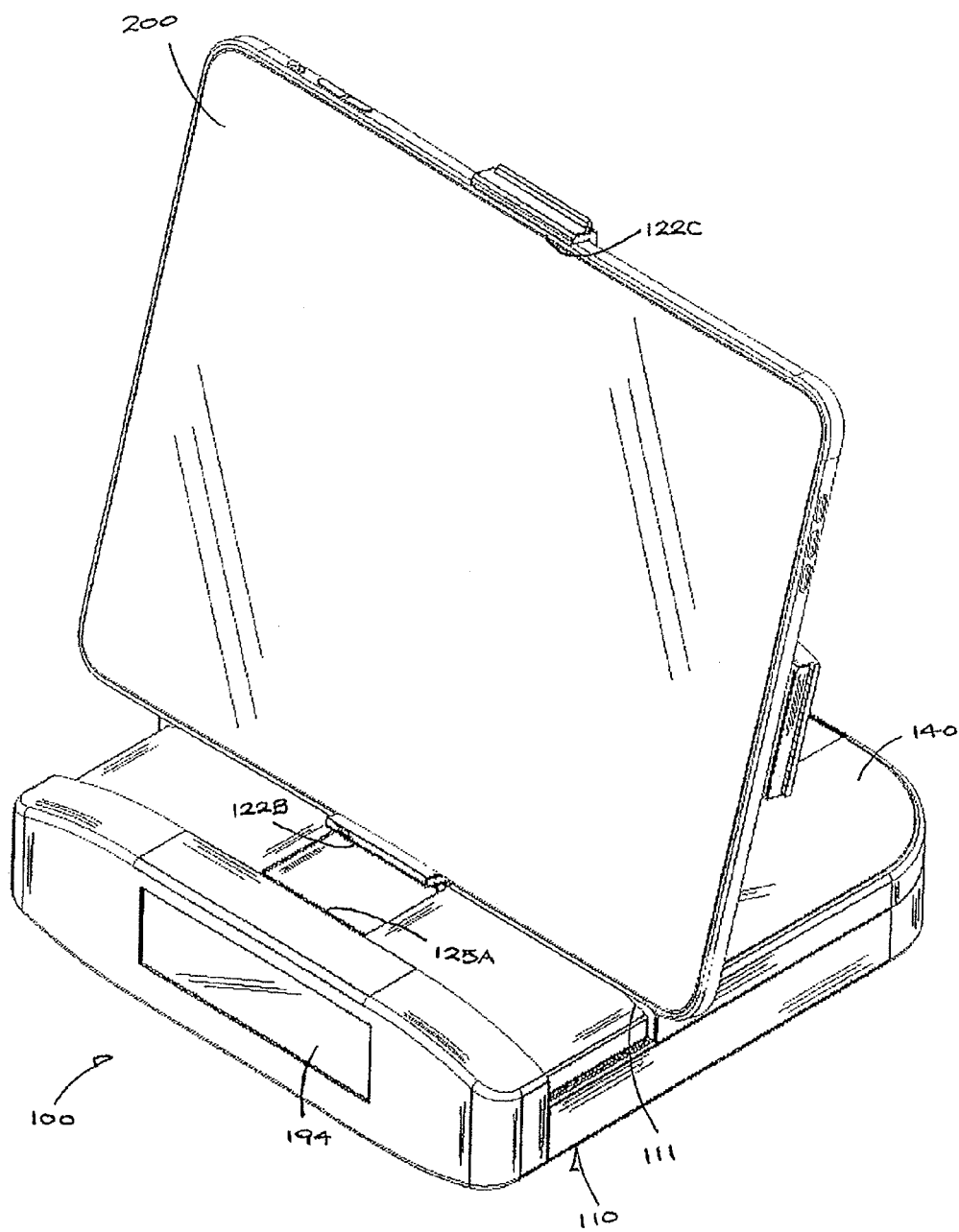
FIG. 15 is a front and right side perspective view corresponding to FIG. 9, showing the docking station supporting a media player in a landscape orientation.
Figure 16:
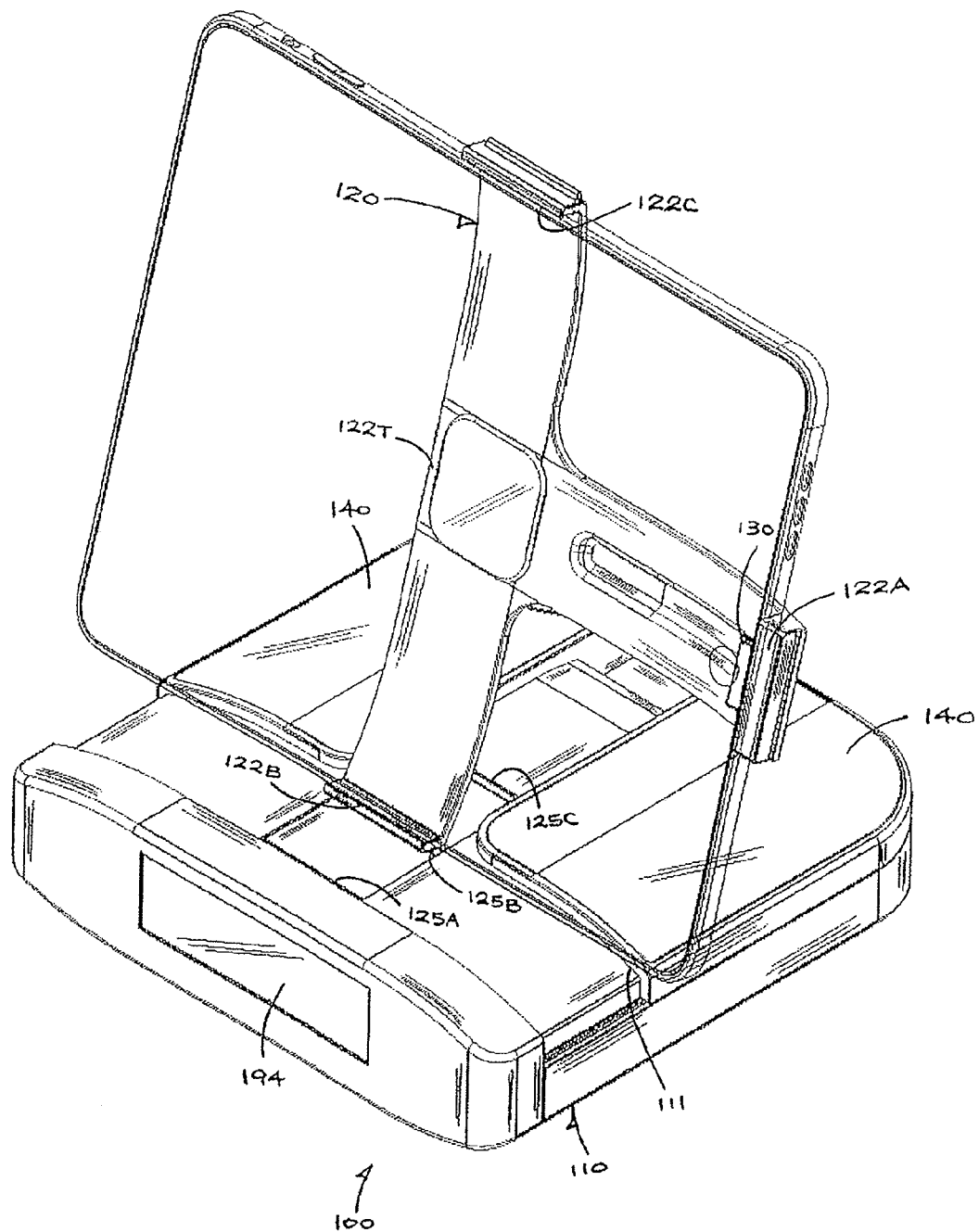
FIG. 16 is a front and right side perspective view similar to FIG. 10, showing the media player transparent to reveal features behind it.
Figure 17:
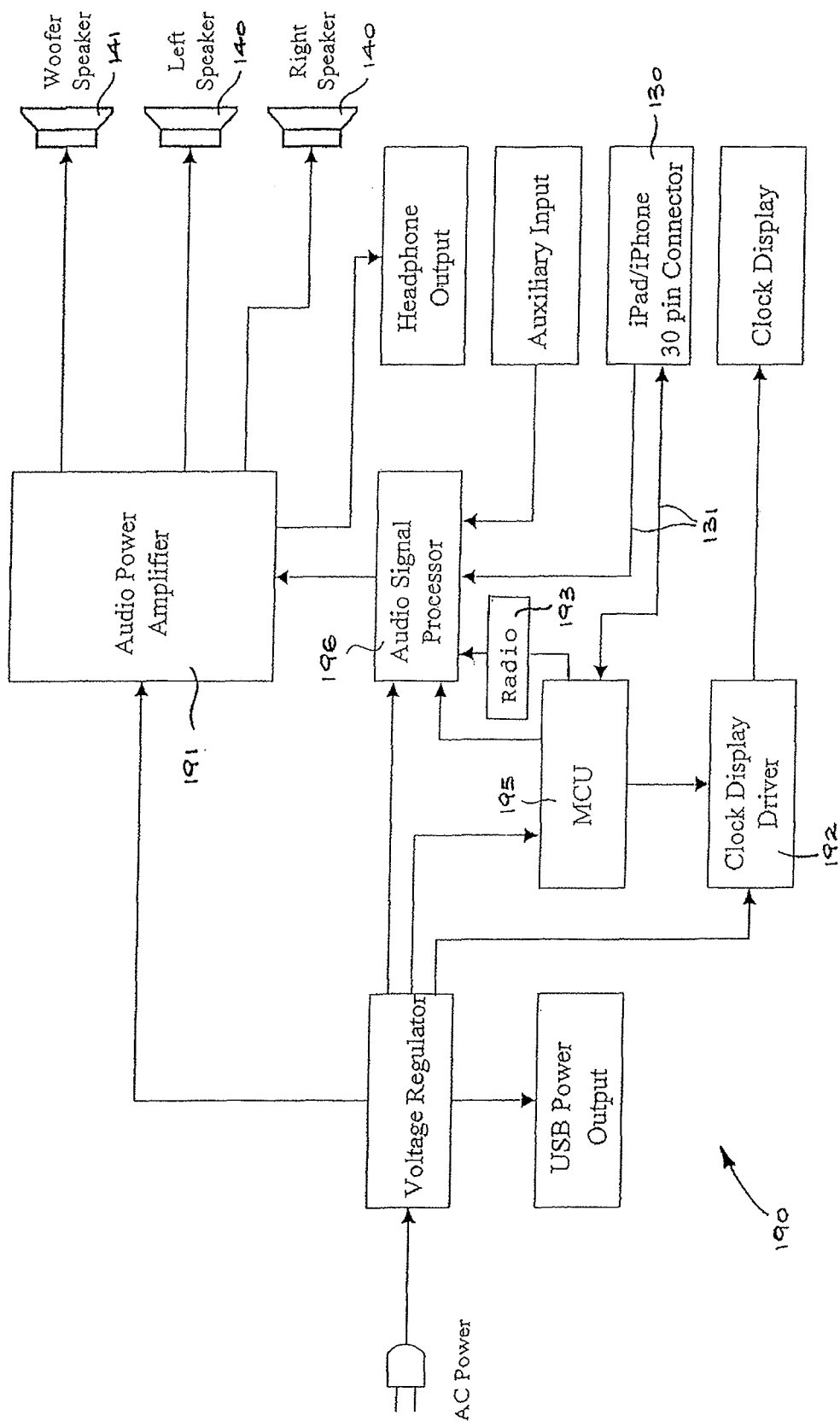
FIG. 17 is a schematic functional block diagram of an operating circuit of the docking station of FIG. 1.

In the portrait orientation, the central lower end 122A of the bracket 122 in the erected position is lowermost and it engages or bears on the base 110 for stability and to support the weight of the iPad 200 (FIGS. 10 and 11). In the landscape orientation, one of the left and right ends 122B and 122C becomes lowermost and it bears on the base 110 likewise for stability and to support the weight of the iPad 200 (FIGS. 15 and 16).

The stand 120 is locatable in the erected position at a selected one of a plurality of angles relative to the base 110. This is achieved by the base 110 being formed, on its upper surface, with a series of three detents or recesses 125A to 125C for selective engagement by the central lower end 122A of the bracket 122 in the portrait orientation, or by the left or right end 122B/122C in the landscape orientation. Each of the detents/recesses 125A to 125C determines a respective angle at which the stand 120 is inclined in the erected position, which are a medium angle in FIG. 12, a larger angle leaning back in FIG. 13 and a less inclined angle in FIG. 14.

In the collapsed position, the leg 121 of the stand 120 overlaps with the central limb of the bracket 122, together forming a generally flat T-shaped structure which is received in the recess 111 of the base 110 of the same or complimentary general shape. The recess 111 has a general shape matching that of the stand 120 for receiving the stand 120 in a fitting manner. In particular, the stand 120 in the collapsed position lies flush with an outer surface of the base 110 around the recess 111, thereby resulting in a non-protrusive shape for the docking station 100 (FIG. 1).

It is not critical for the collapsed stand 120 to be received wholly in the recess 111, nor must it be flush with the base 110. The docking station 100 with its stand 120 collapsed should assume a shape or profile that is smoothly contoured or unobtrusive (i.e. without the stand 120 protruding or sticking out) such that it becomes smaller in size or more compact and hence easier to store or carry around.

It is envisaged that the docking station of the subject invention may be used with a media playing device(s) other than iPad, iPhone or iPad Touch, etc. The basic concept is applicable to docking stations for all and future media players in general.

The invention has been given by way of example only, and various other modifications of and/or alterations to the described embodiment may be made by persons skilled in the art without departing from the scope of the invention as specified in the appended claims.

The invention claimed is:

1. A docking station comprising:
a base having opposed top and bottom surfaces;
at least one speaker located within the base and exposed at the top surface for reproducing sound;
a stand hingedly connected to the base at the top surface of the base for releasably holding a media player;
a signal connector for electrical and mechanical connection to the media player held by the stand;
an operating circuit located within the base and electrically connected to the signal connector for amplifying an audio signal received from the media player via the signal connector, wherein
the at least one speaker is electrically connected to the operating circuit for reproducing sound based on the audio signal amplified by the operating circuit,
the stand is movable relative to the top surface of the base between an erected position, projecting outwardly from and inclined relative to the top surface of the base, for supporting the media player during operation of the docking station and a collapsed position, when the docking station is not in use, and, in the erected position, the stand can selectively hold the media player in both portrait and landscape orientations,
the stand includes
a support comprising a first part and a second part for releasably holding the media player in both of the portrait and landscape orientations, and
a leg having opposed first and second ends, wherein
the leg is pivotally connected at the first end of the leg to the support and pivots about a first axis at the first end of the leg,
the leg is pivotally connected at the second end of the leg to the base, at the top surface of the base and pivots about a second axis, that is parallel to the first axis, at the second end of the leg, so that the stand is pivotably connected to the base for angular movement between the erected position and the collapsed position, and
the leg is pivotally connected at the first end of the leg to the support and pivots about a third axis, that is perpendicular to the first and second axes, at the first end of the leg and relative to the support; and
the base has a recess, in the top surface, for receiving at least part of the stand in the collapsed position, so that the top surface of the base has a non-protrusive shape in the collapsed position of the stand.

2. The docking station as claimed in claim 1, wherein the second part of the support has an end for engaging the base and stabilizing the docking station when the stand is in the erected position and the media player is in the landscape orientation.

3. The docking station as claimed in claim 1, wherein the base has a plurality of detents for selective engagement by ends of the first and second parts of the support, each detent determining a respective angle relative to the top surface of the base at which the stand is inclined in the erected position.

4. The docking station as claimed in claim 1, wherein the stand is locatable, in the erected position, at a selected one of a plurality of angles relative to the top surface of the base.

5. The docking station as claimed in claim 1, wherein the recess has a shape matching that of the second part of the support for receiving the second part of the support.

6. The docking station as claimed in claim 5, wherein the recess and the second part of the support have complementary shapes.

7. The docking station as claimed in claim 1, wherein the second part of the support, in the collapsed position, lies flush with the top surface of the base that surrounds the recess.

8. The docking station as claimed in claim 1, wherein the first and second parts of the support have, together, a shape resembling the letter "T".

9. The docking station as claimed in claim 1, wherein the signal connector is located on the first part of the support.

10. The docking station as claimed in claim 1, wherein the operating circuit includes a clock circuit.

11. The docking station as claimed in claim 1, wherein the operating circuit includes a radio circuit.

12. The docking station as claimed in claim 1, wherein the first part of the support has an end for engaging the base and stabilizing the docking station when the stand is in the erected position and the media player is in the portrait orientation.

13. The docking station as claimed in claim 12, wherein the end of the first part of the support includes the signal connector.

* * * * *